United States Patent
Kawada et al.

[11] Patent Number: 6,084,735
[45] Date of Patent: Jul. 4, 2000

[54] MAGNETIC TAPE DRIVE WITH FUNCTION TO SELECT MAGNETIC HEAD

[75] Inventors: Michitaka Kawada; Kazunori Tsurumaki, both of Tokyo, Japan

[73] Assignee: NEC Corporation, Tokyo, Japan

[21] Appl. No.: 09/045,785

[22] Filed: Mar. 23, 1998

[30] Foreign Application Priority Data

Mar. 31, 1997 [JP] Japan ................................. 9-080996

[51] Int. Cl.[7] .............................. G11B 15/12; G11B 5/09
[52] U.S. Cl. ................................................. 360/63; 360/46
[58] Field of Search .............................. 360/61, 63, 31, 360/53, 74.4

[56] References Cited

U.S. PATENT DOCUMENTS

| | | | |
|---|---|---|---|
| 4,180,838 | 12/1979 | Fehrenkamp | 360/63 |
| 4,953,161 | 8/1990 | Toyama | 360/77.12 |
| 5,353,176 | 10/1994 | Kosuge | 360/63 |
| 5,353,177 | 10/1994 | Yanagibashi | 360/77.12 |
| 5,394,279 | 2/1995 | Furuta | 360/63 |

*Primary Examiner*—W. Chris Kim
*Attorney, Agent, or Firm*—McGinn & Gibb, P.C.

[57] ABSTRACT

There is provided a magnetic tape drive capable of attaining a stable read-out output value of information even if a tracking displacement occurs. The magnetic tape drive of the present invention is a magnetic tape drive for 36-track comprising a magnetic tape 1a having a width of ½ inch and having information written therein by an 18-track magnetic tape drive, a plurality of magnetic heads 2, 3 for performing a reading of information of each of the tracks in the magnetic tape 1a and a control section 9 for controlling a writing or reading operation for information from the magnetic heads 2, 3, wherein as the magnetic heads, each of the forward reading head 2 and the reverse reading head 3 is installed in correspondence with each of the tracks of the magnetic tape 1a. In addition, the control section 9 has a magnetic head selecting function for selecting either the forward reading head 2 or the reverse reading head 3 for reading information in response to a relation of values in outputs of the mutual corresponding magnetic heads 2, 3.

18 Claims, 3 Drawing Sheets

MAGNETIC TAPE DRIVE WITH FUNCTION TO SELECT MAGNETIC HEAD

BACKGROUND OF THE INVENTION

1. Field of the Invention

This invention relates to a magnetic tape drive, and more particularly a magnetic tape drive in which a magnetic tape having information written by a 18-track magnetic tape drive is read by a magnetic tape drive for 36-track magnetic tape.

2. Description of the Prior Art

In the case that a magnetic tape having information written by an 18-track magnetic tape drive is read by a 36-track magnetic tape drive in the prior art system of a magnetic tape drive for writing or reading information into or out of a magnetic tape with a width of ½ inch, only 18 forward reading heads of the magnetic heads for 36 tracks installed in the device were used.

However, the aforesaid prior art magnetic tape drive had some disadvantages as follows. That is, as shown in FIG. 3, there occurs sometimes that a writing position of data, i.e. a position of a track 11 in a magnetic tape written by the 18-track magnetic tape drive is displaced from its normal position due to a certain reason, a so-called tracking displacement is produced. In addition, there occurs sometimes that a position of each of the magnetic heads of the 36-track magnetic tape drive for reading information, i.e. positions of a forward reading head 2 and a reverse reading head 3 may produce a tracking displacement due to a mechanical cause. In these cases, they produced an inconvenience that a reading output value of the 36-track magnetic tape drive becomes low as compared with that of normal case due to the fact that the writing position for data of the magnetic tape and the reading position for the data of the magnetic head are displaced from each other.

In particular, in the magnetic tape drive where a writing/reading for a track with a high writing density is required, a width of each of the tracks is narrow and a space between each of the adjoining tracks becomes narrow. Further, since the space between each of the magnetic heads was also narrow, it generated a disadvantage that it was difficult to restrict a mechanical tracking displacement.

SUMMARY OF THE INVENTION

It is an object of the present invention to provide a magnetic tape drive in which some disadvantages of the prior art can be improved and in particular even if the tracking displacement is produced, a stable reading-out output value of information can be attained.

The magnetic tape drive of the present invention relates to a magnetic tape drive capable of writing and reading tracks of the number of 2N (N is a positive integer) comprising;

- a plurality of magnetic heads having the same width as that of a magnetic tape including information written by the magnetic tape drive and for reading information in each of the tracks in the magnetic tape having information written by the magnetic tape drive capable of performing a writing or a reading in the tracks of the number of N; and
- a control section for controlling writing and reading operations for information performed through the magnetic heads;
- as the magnetic heads, each of forward reading head and reverse reading head being provided in correspondence with each of tracks in the magnetic tape; and
- the control section having a function to select either a forward reading head or a reverse reading head for reading information in response to a relation of values of output of each of the magnetic heads corresponding to each other.

The magnetic tape drive of the present invention is operated such that the function to select the magnetic head may select the magnetic head having a higher peak value of output level of the forward reading head and the reverse reading head.

The magnetic tape drive of the present invention is operated such that the function to select the magnetic head may select the magnetic head having a higher absolute value of difference between a positive peak value of output level and a negative peak value of output level of the forward reading head and the reverse reading head.

The magnetic tape drive of the present invention is a magnetic tape drive in which a writing or a reading can be performed in respect to the tracks of the number of 2N (N is a positive integer), wherein it includes

- a plurality of magnetic heads having the same width as that of the magnetic tape having information written by the magnetic tape drive so as to read information of each of the tracks in the magnetic tape having information written therein by the magnetic tape drive capable of writing and reading information to the tracks of the number of N; and
- a control section for controlling a writing or a reading operation for information performed through the magnetic heads, wherein
- as the magnetic heads, each of the forward reading head and the reverse reading head is provided in correspondence with each of the tracks of the magnetic tape;
- the control section having a magnetic head selecting function to select either the forward reading head or the reverse reading head for reading information in response to a relation of values in outputs of each of the mutual corresponding magnetic heads;
- the magnetic head selecting function selecting the magnetic head having a larger peak value in the output level in the case that the peak values in both output levels of the forward reading head and the reverse reading head are less than a predetermined reference value, and in turn,
- selecting the magnetic head having a peak value in the other output level less than a predetermined reference value in the case that the peak values in one output level exceeds a predetermined reference value.

BRIEF DESCRIPTION OF THE DRAWINGS

The novel features believed characteristic of the invention are set forth in the appended claims. The invention itself, however, as well as other features and advantages thereof, will be best understood by reference to the detailed description which follows, read in conjunction with the accompanying drawings, wherein;

DESCRIPTION OF THE PREFERRED EMBODIMENT

Figure 1:
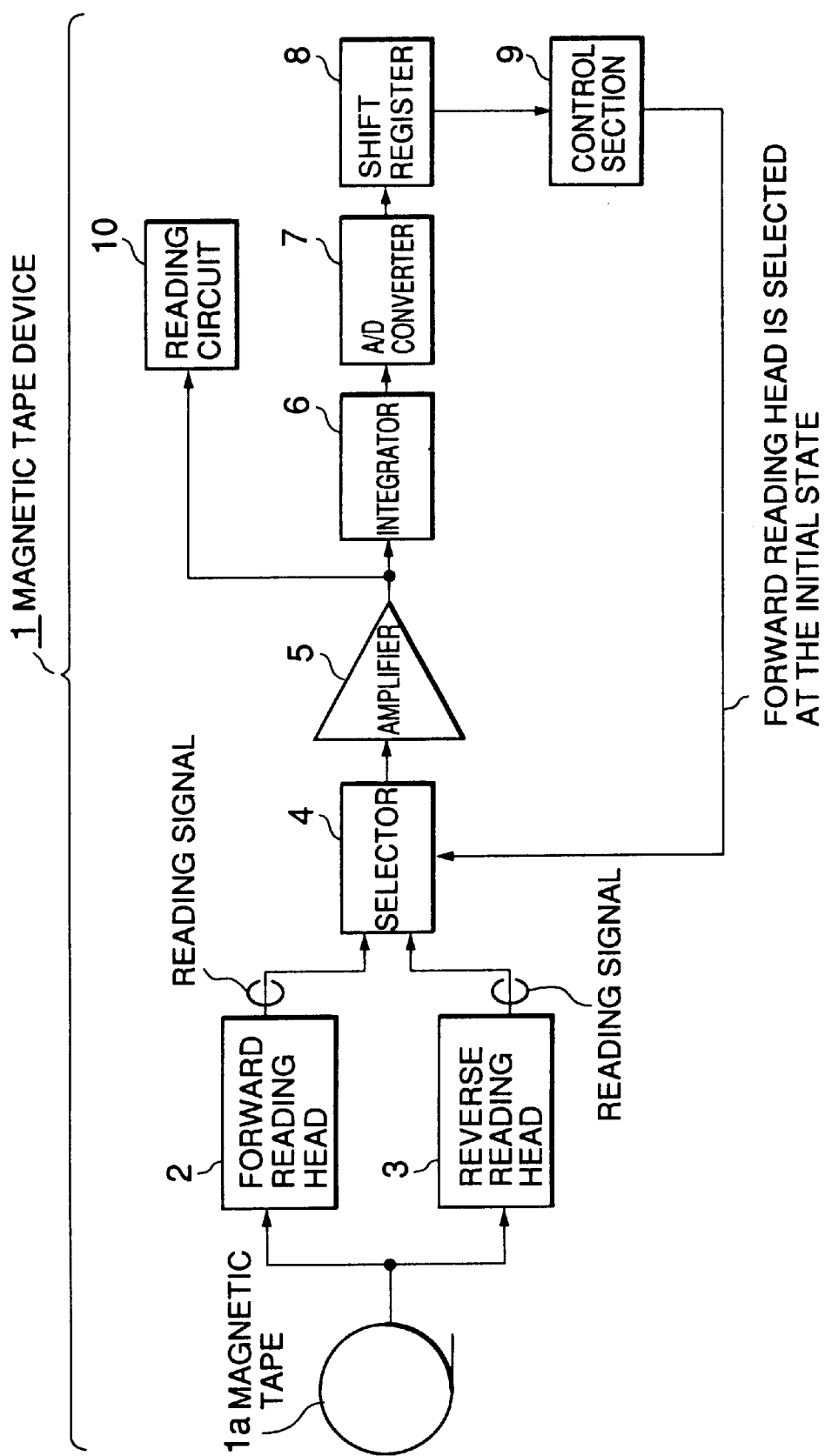
FIG. 1 is a configuration block diagram for showing one preferred embodiment of the magnetic tape drive of the present invention.

Referring now to the drawings, one preferred embodiment of the present invention will be described.

As shown in FIG. 1, the magnetic tape drive 1 of the present invention is a magnetic tape drive for 36-tracks comprising a magnetic tape 1a having a width of ½ inch and having information written therein by an 18-track magnetic tape drive, a plurality of magnetic heads 2, 3 for performing writing or reading of information of each of the tracks in the magnetic tape 1a and a control section 9 for controlling a writing or reading operation for information from the magnetic heads 2, 3, wherein as the magnetic heads, each of the forward reading head 2 and the reverse reading head 3 is installed in correspondence with each of the tracks of the magnetic tape 1a. In addition, the control section 9 has a magnetic head selecting function for selecting either the forward reading head 2 or the reverse reading head 3 for reading information in response to a relation of values in outputs of the mutual corresponding magnetic heads 2, 3.

Referring then to the block diagram of FIG. 1, the present invention will be described in detail as follows, wherein the magnetic tape 1a is one in which information is written by the 18-track magnetic tape drive (not shown) and in particular, back-up data or the like for a computer (not shown) or the like are stored. In the magnetic tape 1a are magnetically written information of 18-tracks, i.e. information of one track written in a lengthwise direction of the tape equally spaced apart in a width direction. The track itself having information written therein has a predetermined width, resulting in that each of the magnetic heads 2, 3 to be described later is faced against the track so as to read information.

In the 36-track magnetic tape drive 1, the magnetic heads are arranged such that 18 forward reading heads 2 and 18 reverse reading heads 3 are installed in correspondence with each of the tracks in a width direction of the magnetic tape 1a. More practically, as for the magnetic tape 1a written by the 18-track magnetic tape drive, there are provided each of one set of forward reading heads 2 and one set of reverse reading heads 3, respectively. That is, as a whole, the forward reading heads 2 and the reverse reading heads 3 are arranged alternatively in a width direction of the magnetic tape 1a.

The magnetic tape drive 1 is provided with a selector 4 for selecting outputs of the forward reading head 2 and the reverse reading head 3. This selector 4 has a function to perform a selective transmission of only an output from either the forward reading head 2 or the reverse reading head 3 under an instruction to select the magnetic head to be described later. In addition, this selector 4 is provided with an amplifier 5 for amplifying a reading signal transmitted from any one of the magnetic heads 2, 3.

The amplifier 5 is provided with an integrator 6 for integrating reading signals after amplification, an A/D converter 7 for sampling outputs from the integrator in a predetermined timing to detect their peak values and converting the values from analogue signals to digital signals and a shift register 8 for outputting bit data in response to the digital signals. Further, the shift register 8 is provided with a control section 9 for storing various information or comparing reading signals from the aforesaid forward reading head 2 and the reverse reading head 3 and selecting an inputting of the reading signal of the selector 4 on the basis of the result of comparison. That is, the control section 9 has a function acting against the aforesaid selector 4 in such a way that the levels of the signals read from each of the magnetic heads 2, 3 are compared to each other so as to select a signal of the magnetic head having a higher signal level. At the initial state, it is set in advance in such a way that information is read out by the forward reading head 2. Further, at a downstream side of the aforesaid amplifier 5 is arranged a reading circuit 10 for reading the signal read out by either the magnetic head 2 or the magnetic head 3.

Then, an operation of the magnetic tape drive 1 of the present invention will be described in detail in reference to the flow chart shown in FIG. 2.

Figure 2:
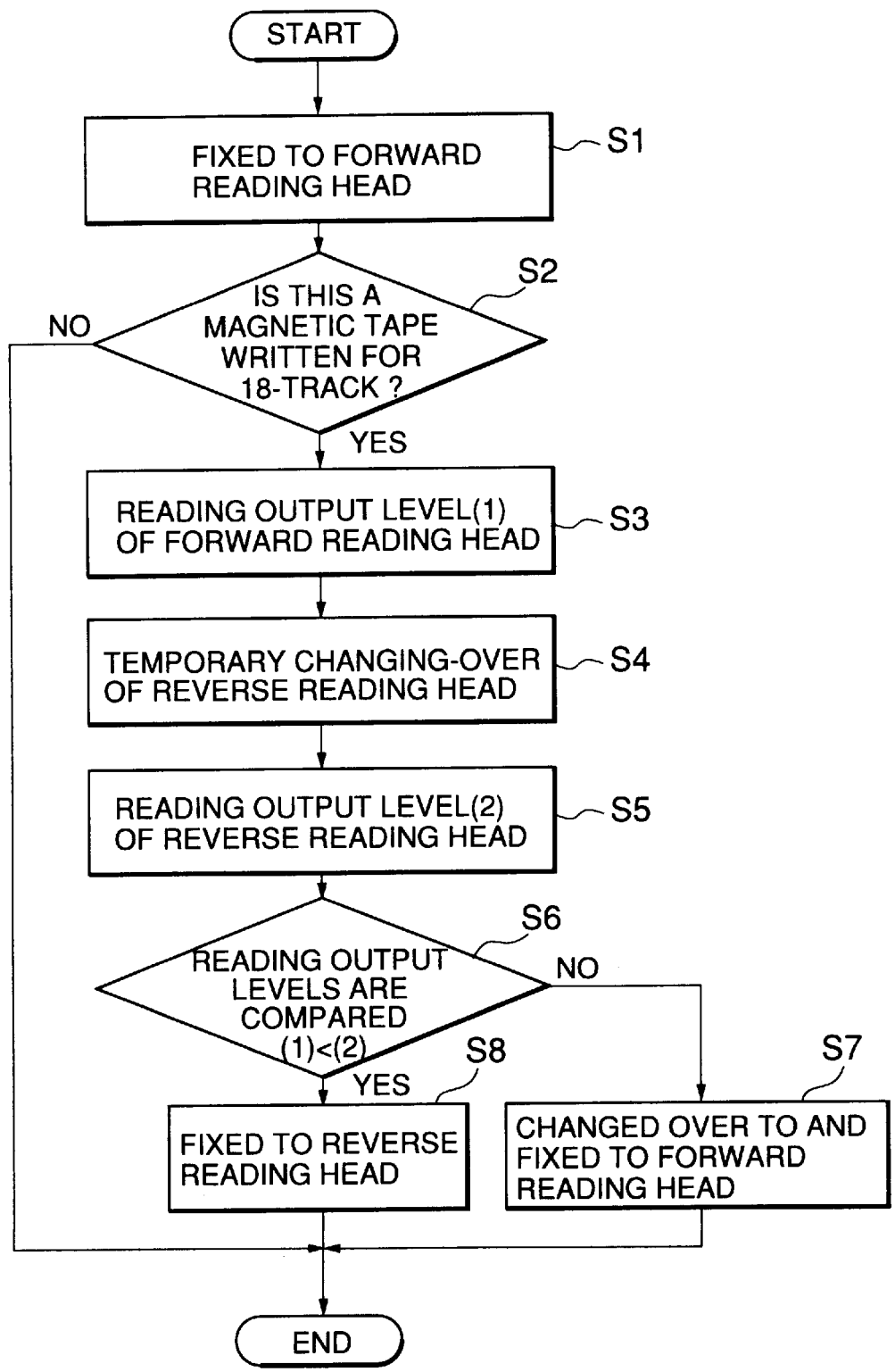
FIG. 2 is a flow chart for showing an operation of the magnetic tape drive disclosed in FIG. 1.

At the initial state of the 36-track magnetic tape drive 1, when the magnetic tape 1 written by the 18-track magnetic tape is read, as for the input to the selector 4, the forward reading head 2 is selected and fixed (a step S1 in FIG. 2). Then, since a pattern capable of discriminating whether or not the tape is written in 18-track is indicated at the beginning of tape (BOT), this pattern is read out to cause the set magnetic tape 1a to be discriminated whether or not the tape is a magnetic tape written in 18-track (a step S2 in FIG. 2). At this time, if the tape is a magnetic tape other that of 18-track, the operation is started for the reading operation for 36-track, resulting in that the reading operation flow for the 18-track magnetic tape is completed. In turn, when it is discriminated that the set magnetic tape is one which is written in 18-track, a predetermined magnetic head selecting operation is carried out.

At first, the magnetic head selecting operation is carried out such that information on the magnetic tape 1a is read out by the forward reading head 2 of the magnetic tape drive. This reading signal is converted from an analogue form to a digital form by an A/D converter 7 after passing through the amplifier 5 and the integrator 6. The reading signal converted into a digital signal is inputted to the shift register 8 and a bit data output corresponding to the digital signal is inputted to the control section 9. At the control section 9, the bit data (output level (1)) attained from the reading signal of the forward reading head 2 is temporarily stored in a predetermined memory (not shown) (a step S3 in FIG. 2).

Then, the control section 9 may act against the selector 4 to change over the reading magnetic head to the reverse reading head 3 (a step S4 in FIG. 2). In concurrent with this operation, the magnetic tape is once wound up and the same information as that read by the forward reading head 2 in the previous operation is read out by the reverse reading head 3. The signal read out of the magnetic tape 1a by the reverse reading head 3 is converted into the bit data (an output level (2)) attained from the shift register 8 in the same manner as that for the forward reading head 2, temporarily stored in the memory in the control section 9 (a step S5 in FIG. 2).

At the control section 9, the output level (1) of the bit data attained from the reading output of the forward reading head 2 is compared with an output level (2) of bit data obtained from the read output of the reverse reading head 3 (a step S6 in FIG. 2). Then, in the case that the output level (2) of the bit data obtained from the reading signal of the reverse reading head 3 is higher than the former one, the reading of the magnetic tape 1a written by the 18-track magnetic tape drive is continued to be read by the reading circuit 10 while an input to the selector 4 is changed over to the reverse reading head 3 and fixed there (a step S7 in FIG. 2). In turn, in the case that the output level (1) of the bit data obtained from the reading signal of the forward reading head 2 is larger than the output level (2), the input of the selector 4 is changed over again to the forward reading head 2, information of the magnetic tape 1a is read out of the forward reading head 2 and read out.

Figure 3:
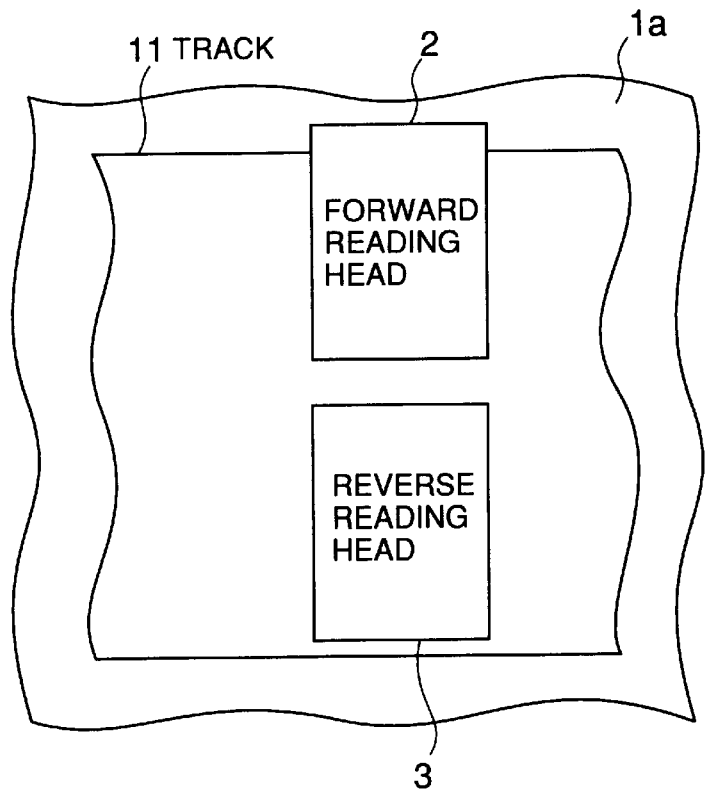
FIG. 3 is an illustrative view for showing a tracking displacement at the magnetic tape drive.

Then, there will be described more practically about a magnetic head selecting function for making a selective changing-over between the forward reading head 2 and the reverse reading head 3 in the case that a tracking displacement is generated between the magnetic tape 1a written by the 18-track magnetic tape drive and the 36-track magnetic tape drive 1. FIG. 3 is a schematic diagram for showing a technical concept in reference to one track 11 in information written on the magnetic tape 1a. This track 11 is moved in a lateral direction as viewed in FIG. 3 at the time of reading/writing operation, and then the forward reading head 2 and the reverse reading head 3 are positioned in correspondence to each other in a forward direction of the track 11.

In addition, FIG. 3 indicates one example in which the magnetic tape 1a is slightly displaced toward the reverse reading head 3. (As a cause to produce such a tracking displacement, this has already been described in the item of "Prior Art".) In this case, a part of the forward reading head 2 is slightly displaced from the surface of the track 11. Generally, the output level of the magnetic head is varied in response to an area corresponding to the track to be read out. Due to this fact, the output level of the signal read by the forward reading head 2 is decreased more than that of usual state. In turn, as shown in FIG. 3, an entire surface of the reverse reading head 3 is oppositely faced against the track 11, so that the signal is read at the normal output level.

Figure 4A:
FIG. 4(A) indicates an output waveform of the forward reading head.
Figure 4B:
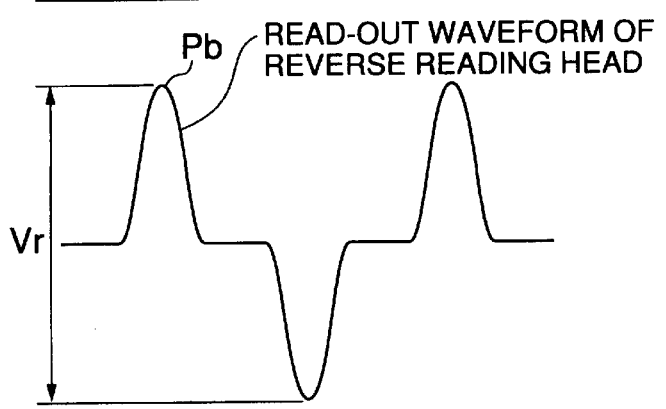
FIG. 4(B) indicates an output waveform of the reverse reading head.

FIG. 4 is a view for showing a read-out wave-form of each of the magnetic heads 2, 3 when the same information is read out and reproduced by the forward reading head 2 and the reverse reading head 3. In this figure, FIG. 4A indicates the case in which information is read by the forward reading head 2 and FIG. 4B indicates a case in which information is read by the reverse reading head 3, respectively. Although each of the output forms is similar to each other, their signal levels are different from each other. That is, an amplitude Vf of the output generated by the forward reading head 2 (an absolute value of a difference between a positive peak value and a negative peak value) is smaller than an amplitude Vr of the output generated from the reverse reading head 3 (an absolute value of a difference between a positive peak value and a negative peak value). It is possible to discriminate that the reverse reading head 3 is more suitable for the reading operation than the forward reading head in view of the difference in output. When the outputs are compared to each other, it may also be applicable that only the output levels (the outputs of the point Pa and the point Pb in FIG. 4) of the same point when the same information is read out are compared to each other.

Additionally, in the case that the read-out waveform read by the magnetic head having a higher output has a remarkable high output while a selection of the magnetic head is being carried out in reference to the foregoing as another preferred embodiment in principle, it may also be applicable that the other magnetic head is selected. That is, in the case that an output of large peak value exceeding a specified constant reference value which is different from a normal value is generated due to a certain cause, the magnetic head having a value less than the other predetermined reference value is selected, thereby it is possible to eliminate bad influence such as a reading error by the aforesaid high output which is different from the normal one.

In the aforesaid preferred embodiments, it has been described the case in which the magnetic tape written by the 18-track magnetic tape in which writing and reading can be carried out in 18-track is read by the 36-track magnetic tape drive, although it is of course apparent in general that the present invention can be applied in quite the same manner as for the case in which the magnetic tape written by an N-track magnetic tape drive capable of performing a writing and a reading in N-track (N is a positive integer) is read by 2N-track magnetic tape drive capable of performing a writing and a reading in 2N-track.

EFFECTS OF THE INVENTION

As described above, the present invention may produce a superior effect that even if a tracking displacement is produced between the magnetic tape written by the 18-track magnetic tape drive and the magnetic head of the 36-track magnetic tape drive and information may not be read out by the forward reading head, the head can be changed over to the most suitable magnetic head through the magnetic head selecting function and then a stable reading-out output value can be attained.

In addition, when the magnetic head is selected, the read-out output levels are compared to each other and selected, so that the selecting operation can be carried out rapidly. Further, patterns of the read-out waveforms are compared with each other, thereby it has a superior effect that it is also possible to select a magnetic head of higher accuracy.

While this invention has been described with reference to illustrative embodiments, this description is not intended to be construed in a limiting sense. Various modifications of the illustrative embodiments, as well as other embodiments of the invention, will be apparent to persons skilled in the art upon reference to this description. It is, therefore, contemplated that the appended claims will cover any such modifications or embodiments as fall within the true scope of the invention.

What is claimed is:

1. A magnetic tape drive capable of writing and reading tracks of the number of 2N (N is a positive integer) comprising:

a plurality of magnetic heads having the same width as that of a magnetic tape including information written by said magnetic tape drive and for reading information in each of the tracks in the magnetic tape having information written by a magnetic tape drive capable of performing a writing or a reading in the tracks of the number of N; and a control section for controlling writing and reading operations for information performed through the magnetic heads, wherein said magnetic heads comprise a forward reading head and a reverse reading head being provided in correspondence with each of the tracks in said magnetic tape, and wherein said control section selects either the forward reading head or the reverse reading head for reading information from the magnetic tape based upon a comparison of output values of said magnetic heads.

2. A magnetic tape drive according to claim 1, wherein said control section selects said magnetic head having a higher peak value of output level of said forward reading head and said reverse reading head.

3. A magnetic tape drive according to claim 2, wherein a value of said N is 18.

4. A magnetic tape drive according to claim 1, wherein a value of said N is 18.

5. A magnetic tape drive according to claim 1, wherein said control section selects said magnetic head having a higher absolute value of difference between a positive peak value of output level and a negative peak value of output level of said forward reading head and said reverse reading head.

6. A magnetic tape drive according to claim 5, wherein a value of said N is 18.

7. The magnetic tape drive according to claim 1, wherein said control section includes a comparator for comparing said output values of said forward reading head and said reverse reading head, provided in correspondence with each of the tracks in said magnetic tape, to produce said comparison.

8. The magnetic tape drive according to claim 1, wherein said control section includes means for comparing said output values of said forward reading head and said reverse reading head, provided in correspondence with each of the tracks in said magnetic tape, to produce said comparison.

9. A magnetic tape drive in which a writing or a reading can be performed in respect to the tracks of the number of 2N (N is a positive integer), comprising:

a plurality of magnetic heads having the same width as that of a magnetic tape having information written by said magnetic tape drive so as to read information of each of the tracks in the magnetic tape having information written therein by a magnetic tape drive capable of writing and reading information to the tracks of the number of N; and a control section for controlling a writing or a reading operation for information performed through the magnetic heads, wherein said magnetic heads comprise a forward reading head and a reverse reading head provided in correspondence with each of the tracks of said magnetic tape, wherein said control section selects either the forward reading head or the reverse reading head for reading information from said magnetic tape based upon a comparison of output values of said magnetic heads, and wherein said control section selects said magnetic head having a larger peak value in said output level in the case that the peak values in both output levels of said forward reading head and said reverse reading head are less than a predetermined reference value, and wherein when the peak values in one output level exceeds a predetermined reference value, said magnetic head having a peak value in the other output level less than a predetermined reference value is selected.

10. A magnetic tape drive according to claim 9, wherein a value of said N is 18.

11. The magnetic tape drive according to claim 9, wherein said control section includes a comparator for comparing said output values of said forward reading head and said reverse reading head, provided in correspondence with each of the tracks in said magnetic tape, to produce said comparison.

12. The magnetic tape drive according to claim 9, wherein said control section includes means for comparing said output values of said forward reading head and said reverse reading head, provided in correspondence with each of the tracks in said magnetic tape, to produce said comparison.

13. A magnetic storage medium drive capable of a writing operation or a reading operation performed in respect to the tracks of the number of 2N (N is a positive integer) on a magnetic storage medium, comprising:

a plurality of magnetic heads for reading information in each of the tracks in said magnetic storage medium having information written thereon by a magnetic storage medium drive capable of performing a writing or a reading in the tracks of the number of N; and a control section for comparing output signals from said magnetic heads and selecting one of said magnetic heads on the basis of a result of a comparison of output signals of said magnetic heads.

14. The magnetic storage medium drive, as claimed in claim 13, wherein said magnetic heads comprise a forward reading head and a reverse reading head provided in correspondence with each of the tracks in said magnetic storage medium.

15. The magnetic storage medium drive, as claimed in claim 14, wherein said control section selects said magnetic head having a higher absolute value of difference between a positive peak value of output level and a negative peak value of output level of said forward reading head and said reverse reading head.

16. The magnetic storage medium drive according to claim 14, wherein said control section includes a comparator for comparing said output signals of said forward reading head and said reverse reading head provided in correspondence with each of the tracks in said magnetic storage medium to produce said comparison.

17. The magnetic storage medium drive according to claim 14, wherein said control section includes means for comparing said output signals of said forward reading head and said reverse reading head provided in correspondence with each of the tracks in said magnetic storage medium to produce said comparison.

18. The magnetic storage medium drive, as claimed in claim 13, wherein when the peak values in one output level exceeds a predetermined reference value, said magnetic head having a peak value in the other output level less than a predetermined reference value is selected.

* * * * *